United States Patent [19]

Shorr et al.

[11] Patent Number: 5,180,787
[45] Date of Patent: Jan. 19, 1993

[54] FLAME RETARDANT POLYMER COMPOSITIONS

[75] Inventors: Leonard M. Shorr; Theodor M. Fishler, both of Haifa; Shaul Yanay; Michael Rumack, both of Beer-Sheva, all of Israel

[73] Assignee: Bromine Compounds, Ltd., Beer-Sheva, Israel

[21] Appl. No.: 617,379

[22] Filed: Nov. 26, 1990

Related U.S. Application Data

[63] Continuation-in-part of Ser. No. 251,056, Sep. 26, 1988, abandoned, which is a continuation of Ser. No. 859,784, May 5, 1986, abandoned.

[30] Foreign Application Priority Data

Jun. 9, 1985 [IL] Israel ......................................... 75459

[51] Int. Cl.$^5$ .................. C08F 267/10; C08F 265/10; C08F 283/04; C08F 20/00
[52] U.S. Cl. .................................... 525/282; 525/574; 525/426; 525/445
[58] Field of Search ................ 525/374, 282, 426, 445

[56] References Cited

U.S. PATENT DOCUMENTS

| | | | |
|---|---|---|---|
| 3,489,822 | 1/1970 | Witt et al. | 525/288 |
| 3,900,531 | 8/1975 | Mathews | 525/282 |
| 4,604,422 | 8/1986 | Younes | 524/502 |

FOREIGN PATENT DOCUMENTS 0011322  1/1984  Japan .................................. 525/282

OTHER PUBLICATIONS

*Chemical Abstracts,* vol. 89, No. 13, Feb. 15, 1978, p. 844, abstract No. 108730g, Hrabak et al "Halo derivatives of N-Phenylmaleimide".

*Chemical Abstracts,* vol. 96, No. 16, Jan. 1, 1982, p. 56, abstract No. 124033q, Ambros et al, "Self-Extinguishing mixtures of poly(phenylene oxide) with polystryene and its copolymers".

V. Hynkova et al, "Journal of Polymer Science": Polymer Chemistry Edition, vol. 14, pp. 2587–2588, 1976.

M. Bexder et al, "Journal of Polymer Science": Polymer Chemistry Edition, vol. 17, pp. 2857–2864, 1979.

F. Hrabak et al, "Thermogravimetric Analysis and the Flash-Ignition and Self-Ignition Temperatures of Copolymers ...", European Polymer Journal, vol. 13, pp. 509–513, 1977.

F. Hrabak et al, "Thermal Decomposition of Copolymers of Styrene and Halogenated Monomers", European Polymer Journal, vol. 14, pp. 219–223, 1978.

*Primary Examiner*—James J. Seidleck
*Assistant Examiner*—W. R. H. Clark
*Attorney, Agent, or Firm*—Foley & Lardner

[57] ABSTRACT

The present invention relates to fire retardant polymer compositions possessing a non-liner structural configuration resulting by the reaction of N-tribromo-phenylmaleimide, with or without comonomer, with a preformed backbone polymer, in which the bromine content is above 1.2% by weight bromine. The polymer is selected from polystyrene, polyolefins, polyamides, rubbers, polyesters, acrylics, polymeric dienes and mixtures or copolymers thereof. The comonomer present with the N-tribromophenyl-maleimide is selected from the group consisting of acrylonitrile, styrene and vinyl chloride. According to the invention the non-linear structural configurations are obtained either by grafting or crosslinking of the N-tribromophenylmaleimide onto the preformed backbone polymer in the presence of free radical producing means. Optionally, synergistic fire retardant additives such as antimony oxide are incorporated in the compositions. The preformed backbone polymer must be no less than 4% by weight of the total resin present in the compositions. The flame retardant polymer compositions have improved properties compared with those obtained with known flame retardant reagents.

20 Claims, No Drawings

FLAME RETARDANT POLYMER COMPOSITIONS

This application is a continuation-in-part of application Ser. No. 07/251,056, filed Sep. 26, 1988, which is a continuation of 359,784 filed May 5, 1986 both now abandoned.

The present invention relates to flame retardant polymer compositions. More particularly the invention relates to polymer compositions comprising non-linear structural configurations which contain bromo-derivatives of N-phenylmaleimide.

It is known that generally, normally flammable polymers can be rendered flame-retardant by the incorporation of halogenated organic compounds. It is also recognized that not all halogenated organic compounds are necessarily useful as flame retardation. Consequently, the effectiveness of halogen-containing organic materials intended for use as fire retardants is unpredictable. Some materials release their halogen either too early or too late in the combustion process to provide the degree of fire protection required.

Some of the halogenated compounds which have been proposed for use as flame retardants, have one or more of the following disadvantages: volatility, instability towards decomposition and/or discoloration at processing temperatures, inadequate efficiency, incompatibility and UV instability.

Some of the above disadvantages make a compound less desirable for use as flame retardant and others actually prevent it from having any practical utility for such applications. The general lack of success of the prior art in producing a wide spectrum flame retardant reagent, or an optimal material for even a more limited range of applicability, is at least partially due to the tendency of the flame retardant to degrade at least one of the properties of the blend produced while improving another. For instance, it has been found that compounds containing cycloaliphatic bromine are sometimes more efficient than other halogenated compounds, but these compounds have poor stability at the processing temperatures of some polymers and frequently have other disadvantages, such as volatility, toxicity and incompatibility. It is clearly advantageous that a single flame retardant additive find use in a a large number of applications.

It is well known that halogenated atoms bonded into the polymeric chain, can be efficient or inefficient depending not only on their concentration in the macromolocule, but also on their position. Also, halogen-containing compounds will behave differently when they are used int he additive mode, i.e. simply admixed into the polymeric substrate, or chemically bonded into the polymeric chain.

Halo-derivatives of N-phenylmaleimide are described in Czech Patent No. 171,355 (filed on Nov. 27, 1972) and Czech Patent No. 173,355 (filed on Dec. 16, 1974) both published in 1979, as new compounds which are insoluble in water and aliphatic hydrocarbons, some being characterized by their high halogen content. According to Czech Patent No. 171,593 the halo-derivatives on N-phenylmaleimide are suggested to be useful as comonomers with various monomers such as vinyl acetate, acrylonitrile, styrene, in the preparation of thermally resistant polymeric materials. The polymers described possess a linear structure and are prepared from the monomers taken in such a ratio that the halogen content of the polymers would be between 16% to 25% by weight. In a review written by the inventors of the above Czech Patents [J.Polym.Sci.Pol.Chem.Ed. 14, 2587 (1978) and 17, 2587 (1979)] it is mentioned that mono- and polyhalophenylmaleimides have a strong tendency to form alternating copolymers with styrene and butadiene, while by themselves they are only hardly polymerizable. Of these alternating copolymers, the system with styrene was most studied. According to the results published [Eur.Polym. J. Vol.14, 219 (1978)tribromophenylmaleimide copolymers with styrene were found to undergo spontaneous decomposition at 352 degrees C. whereas polystyrene decomposes at 280 degrees C. These results support their statement on the thermal resistance of these copolymers. They further stipulate that the presence of the imide monomeric unit, in the alternating polymer, retards the depolymerization of the polymer chain. The result of this finding is that less of the combustible volatile hydrocarbon will be released under thermal stress. Of the various halogen-containing comonomers examined by them, tribromophenylmaleimide was found to produce the least amount of HX, commonly regarded to be the agent responsible for flame retardation by halogen containing compounds. More bromine was found in the thermolized residue than in the starting copolymer. The conclusion drawn by these workers is clear from their Czech Patent No. 171,593, where only the color-derivative is stated for use as comonomer in polymeric materials for fire retardation.

It is well known that halogen-containing compounds generally behave differently when the incorporation is in such a manner that the halogen atom is incorporated in units of the polymeric backbone or in a pendant side chain. It is thought that pendant side chains are sometimes lost under stress conditions and with them the fire retardant properties. The general conclusions is that one cannot predict a priori that a halogen-containing component incorporated into a macromolecule will be efficient or not. This is true even for halogens in the backbone units but distributed differently. This is clearly stated also by the inventors of the above two Czech Patents in a paper discussing the thermogravimetric analyses of copolymers of styrene with halogenated N-phenylmaleimide (published in Europ. Polymer J., Vol. 13, 509–513, 1977):

"copolymerization of compounds with quenching effects can lead to products ranging from alternating copolymers to polymers with chains consisting of homopolymer sections of the two starting compounds. The thermal stabilities of the two types of polymer and the products of the thermal decomposition may be different even if the halogen contents are the same".

It has now been found that the tribromoderivative of N-phenylmaleimide is amenable to the production of non-linear polymeric configurations, in which this bromo-derivative is contained in pendant side chains or crosslinks, by its reaction with various preformed polymers, imparting to them fire retardant properties. Thus the invention consists of fire retardant polymer compositions comprising non-linear structural configurations, which results from reacting N-tribromo-phenyl-maleimide with or without comonomers with a preformed backbone polymer selected from the group consisting of polyolefins, polystyrene, rubbers, polyesters, polyamides, acrylics, polymeric dienes and mixtures or copolymers thereof, said fire retardant compositions containing at least 1.2% by weight bromine. The above performed backbone polymers may also contain common substituents.

Thus, the invention comprises fire retardant polymer compositions comprising non-linear structural configurations consisting essentially of from 2% to 60% by weight of N-tribromophenylmaleimide, or N-tribromophenylamaleimide together with a comonomer selected from the group consisting of an acrylate ester, a methacrylate ester, vinyl acetate, a vinyl halide, a vinylidene halide, acrylonitrile, butadiene, chloroprene, styrene, isobutylene, acrylamide, maleic anyhydride and a mixture thereof, directly bonded by means of free-radical initiation to a preformed backbone polymer selected from the group consisting of a polyolefin, a polyamide, a natural rubber, a polyester, an acrylic polymer and a mixture or a copolymer thereof to form a graft polymer containing at least 1.2% by weight bromine in its pendant side chains or crosslinks, wherein acrylonitriles and alkenes are not used together as comonomers with N-tribromophenylmaleimide when the backbone polymer is a diene rubber.

Non-linear structural configurations as used in the present specification, and as described above, are known in the art as graft copolymers. The non-linear polymeric composition of this invention are obtained either by graft polymerization or cross-linking with N-tribromophenylmaleimide, hereafter referred, for the sake of brevity, by the term TBPMI. The graft polymers have either TBPMI or TBPMI-containing side chains bonded onto a preformed polymeric backbone which does not contain TBPMI. The crosslinked polymer will be obtained by the formation of chemical links containing TBPMI between the preformed polymer chains which do not contain TBPMI. The nature of the final compositions will be determined by the relative proportions of the constituents—TBPMI, comonomers and the respective preformed backbone polymer—and the grafting technique employed; actually a wide variety of novel compositions can be obtained. In order to optimize the best combination of good processing and performance properties (e.g. high tensile strength), it is preferred to obtain products containing from 2% to 60% by weight of TBPMI and the balance of the preformed backbone polymer with or without other polymerizable monomers, wherein the preformed backbone polymer must be no less than 4% of the total resin.

The inventors explain the excellent fire retardancy properties of TBMPI, when located in the side chains and of graft polymers, by the relative weakness of the bonds of such pendant groups. These pendant groups are detached under thermal stress, thereby injecting volatile bromine moieties into the vapor phase. This mechanism stands in strong contrast with the high thermal resistance mentioned to exist by the Czech authors (cited in the preamble of the present specification) when TBPMI is present in linear structural copolymers.

The present invention is particularly related to TBPMI, although one may conceive to utilize other bromine derivatives of N-phenylmaleimide.

The compositions according to the present invention may be prepared by any of the conventional techniques of free radical grafting or crosslinking processes used, e.g. radiation induced or chemically induced and by any of the technologies commonly used such as bulk, solution, emulsion or aqueous suspension. One of the grafting reaction procedures for the above process is grafting in an aqueous medium which enables a ready dissipation of the heat of the reaction and avoids the use of expensive solvent recovery apparatus. The emulsion polymerization in aqueous medium is effected by reacting the ingredients dispersed in water in the present of a surface active agent such as salts of a long chain alkyl sulfate. The temperatures normally used lie between 20 to 100 degrees C. and preferably between 25 to 75 degrees C.

The reaction between the preformed backbone polymer and TBPMI with or without additional polymerizable monomers, may be initiated as stated above by any suitable means which produces free radicals, but may often be effected in the presence of a free radical yielding initiator active at the polymerization temperature. Initiation may also be induced by radiation, or known reagents such as azo-compounds (e.g. nitriles) and organic peroxides such as lauroyl peroxide, dicumyl peroxide, 2.5-(ditert-butylperoxy)-2,5-dimethylhexyne-3, persulfates, hydrogen peroxide, hydroperoxides, or sulfur (in case of rubber as the preformed backbone polymer) and other compounds containing the peroxide linkage.

Whereas the system according to the present invention involves a graft polymerization, between a preformed polymer and TBPMI, one may conceive to incorporate cross-linking activators which will further enhance the efficiency of the grafting reaction. The crosslinking density will depend on the reaction conditions and the ratio between the preformed polymer, TBPMI, cross-linking activator, other monomers when used, as well as on the presence of reactive groups in the preformed polymer.

The type of initiator and its concentration, the chemical nature of the preformed polymer, e.g. the presence of the steric hindrance, are important factors which will influence the efficiency of the grafting reaction. These factors are fully described in the literature and a person skilled in the art after reading this specification will be able to select the factor(s) applicable to the specific system of concern.

Although the flame retardant polymer compositions obtained according to the present invention are by themselves very efficient, one may further enhance their effectiveness by including one or more synergists conventionally used in flame retardation. These synergistic compounds include oxides, sulfides or organic salts of antimony, boron, arsenic or zinc borate. The preferred synergistic compound for use in the compositions of this invention is antimony trioxide.

it was found that the new non-linear compositions obtained by the reaction of preformed polymers with TBPMI, have improved important mechanical properties.

For example it has been found that TBPMI produces crosslinked compositions with various types of polyethylene, which compositions are superior to those obtained with other known fire retardants consisting of bromine-containing. compounds such as decabromodiphenyl ether or brominated bisimides (so called BT-93). In the following Table 1 are summarized the comparative results of some of the properties for each compositions based on 100 parts of high density polyethylene. The cross-linking was carried out at 200 degrees Celsius using 1 part of 2,5-di(tert-butylperoxy)-2,5-dimethylhexyne-3 as catalyst in each case. In all these experiments antimony oxide synergist was added in the final formulations.

TABLE 1

Comparison of properties of 100 parts of high density polyethylene (Lupolene 5011K, producted by BASF) compositions with bromine-containing compounds.

| | Exp. No. | | | | |
|---|---|---|---|---|---|
| | 1 | 2 | 3 | 4 | 5 |
| Compositions (parts by weight). | | | | | |
| Deca | 22 | 30 | — | — | — |
| BT-93 | — | — | 30 | — | — |
| TBPMI | — | — | — | 30 | 36 |
| AO | 7.5 | 10 | 10 | 10 | 12 |
| % Bromine content | 13.82 | 17.45 | 14.04 | 12.13 | 13.77 |
| Properties. | | | | | |
| LOI | 25.5 | 27.7 | 28.1 | 32 | 32.6 |
| Tensile strength | 14.3 | 15 | 14.3 | 18 | 18.3 (expressed in MPa) |
| Tensile modulus | 490 | 630 | 500 | 610 | 710 (expressed in MPa) |
| Elong. at break % | 160 | 123 | 35 | 168 | 88 |
| % Gel | 64 | 50 | 82 | 91 | 89 |

(Deca = decabromodiphenyl ether;
BT-93 = brominated bisimide;
AO = antimony oxide;
MPa = megapascal).

As seen in the above Table 1, the extend of crosslinking, as shown by the gel content, using the compositions according to the present invention based on TBPMI, is much higher than for the decabromodiphenyl ether and even better than the brominated bisimide which is in particular recommended for polyethylene. The LOI values as well as the mechanical properties, which are better for the compositions according to the present invention, show their advantage over other compositions with known bromine-compounds as fire retardant reagents.

Similar improvements are obtained using TBPMI-based flame retardant compositions with low density polyethylene as the base polymer. Table 2 compares the properties of such compositions (based on 100 parts low density polyetylene) with TBMPI and decabromodiphenyl ether, both systems reacted at 150 degrees C. in the presence of 4 parts of dicumyl peroxide as catalyst.

TABLE 2

Comparison of properties of compositions based on 100 parts low-density polyethylene (Epithene 300, produced by Israel Petrochemicals Ltd.) with bromine-containing compounds.

| | Exp. No. | | | | | |
|---|---|---|---|---|---|---|
| | 1 | 2 | 3 | 4 | 5 | 6 |
| Compositions (parts by weight). | | | | | | |
| Deca | 22 | — | — | — | — | — |
| TBPMI | — | 25 | 25 | 30 | 35 | 40 |
| AO | 7.5 | 8 | 8 | 10 | 12 | 13 |
| TAC | 2 | — | 2 | 2 | 2 | 2 |
| % Bromine content | 13.31 | 10.4 | 10.25 | 11.71 | 13.04 | 14.34 |
| Properties | | | | | | |
| LOI | 25.8 | 26.9 | 26.7 | 28.1 | 29.7 | 30.3 |
| UL 94 | U-B | U-B | U-B | V-2 | V-O | V-O |
| Tensile strength | 8.6 | 11.3 | 12.6 | 14.8 | 13 | 10 |
| Tensile Modulus | 87 | 130 | 130 | 160 | 140 | 170 |
| Elong. at break % | 127 | 200 | 244 | 270 | 86 | 30 |
| % Gel | 74 | 94 | 96 | 96.5 | 87 | 90 |

(Deca = decabromodiphenyl ether;
TAC = triallyl cyanurate used as accelerator;
AO = antimony oxide.
The tensile strength measurements were determined according to ASTM D-638-68).

The results given in Table 2 clearly show that the extent of crosslinking, expressed as percentage of gel, is higher with the compositions according to the present invention than those with decabromodiphenyl ether. The mechanical properties (tensile strength and tensile modulus) are also better with the compositions according to the present invention than those obtained with decabromodiphenyl ether. The mechanical properties mentioned in Tables 1 and 2, were determined for plates of polyethylene crosslinked with TBPMI according to the present invention, said plates being prepared as follows:

An amount of 30 g of the mixture (of compositions mentioned above) was introduced into the closed chamber of a Brabender internal mixer heated and maintained at 130 degrees C. The two mixing heads of the Brabender were allowed to turn at a speed of 20 pm throughout each experiment and the consequent torque was registered on a graph versus the time. The mixture was taken out from the Brabender and pressed between the two plates of a hydraulic press and allowed to crosslink during ten minutes at 210 degrees C.

The gel contents were measured according to ASTM D-2765-68 using xylene.

Another example of a non-linear polymer found advantageously flame retarded by TBPMI, is acrylonitrile-butadiene-sytrene. Such ABS resins are well known engineering thermoplastics possessing excellent physical characteristics. In many of its applications, such as building materials and appliances, business machines etc., it is necessary that the ABS polymer by flame retardant. The commonly used highly brominated aromatic compounds used as flame retardants, confer a number of adverse effects to the products:

Mold build-up of the brominated compound during processing with resulting surface degradation.

Severe degradation of overall balance of physical properties of the ABS polymer, particularly of impact strength.

Poor efficiencies which cause high levels of halogen and antimony oxide in order to impart an adequate flame retardancy.

Bloom or exudation of flame retardants onto the surface of the molded specimens.

It was found that in accordance with the present invention, TBPMI imparts an excellent flame retardance to ABS resins. Blooming is not a problem with TBPMI incorporated into this branched polymer and good overall physical properties are obtainable.

Example 1 is an ABS formulation with the flame retardant reagent according to the present invention and Example 2 without the reagent, being presented for comparison purposes.

Essentially all of that initially introduced was therefore grafted onto the HIPS resin.

Similar results were obtained with ABS resin. The experiments were performed in the same manner and are summarized in the following Table 4.

TABLE 4

Grafting of TBPMI onto ABS resin (Ronfalin T-PWD NAT 0001 produced by DSM).

| Exp. No. | Composition (parts by weight). | | | | | | Torque (Newt. meters) | | LOI |
|---|---|---|---|---|---|---|---|---|---|
| | ABS | XL-130 | Mg stearate | Irgawax 280 | $Sb_2O_3$ | TBPMI | Initial | Final | |
| 3 | 56 | 0.4 | 0.5 | 0.5 | 5.5 | 38.1 | 10.8 | 25 | 37.2 |
| 4 | 41.3 | 0.6 | 0.5 | 0.5 | 7.3 | 50.8 | 10.8 | 22.5 | 40.8 |

EXAMPLE 1

In a test tube the following reagents were introduced:
10 g polybutadiene.
38.6 g styrene.
25.7 g acrylonitrile.
1.5 g azoisobutyronitrile.
25.7 g of TBPMI.

The contents of the test tube were thoroughly mixed and purged with nitrogen. After closing the test tube, it was heated at 65 degrees C. for about 4 hours and then for an additional period of 12 hours at 100 degrees C. The test tube was broken and the polymerized mass was ground. Its bromine content was 15%. From the ground material a plate was pressed from which specimens were cut, which had an LOI value of 23.3.

EXAMPLE 2

A blank experiment was carried out for comparison purposes. The same procedure was used as in Example 1, with the same amounts of reagents but with the omission of the flame retardant reagent. The specimen had an LOI value of only 17.9.

Polystyrene is another resin found to be rendered flame retardant by grafting onto it TBPMI. As known, styrene-based resins are widely used and make up a significant part of the plastic industry. One great deficiency of sytrenic resins is their flammability, and there is an ever increasing awareness and interest in providing styrene-based polymers which possess flame retardancy.

TBPMI was grafted onto high impact polystyrene, on a Brabender instrument using two compositions containing different amounts of bromine (Table 3). Grafting is shown by the increase in the torque. The conditions in the Brabender were: temperature=200 degrees C. and the mixing rolls had a speed of 40 rpm. The compositions tested were prepared with the use of peroxide XL-130 (produced by Pennwalt).

TABLE 3

Grafting of TBPMI onto High Impact Polystyrene (Galirene Q-88-5 produced by Israel Petrochemicals Ltd.).

| Exp. No. | Composition (parts by weight) | | | | | Torque (newt.meter) | | LOI |
|---|---|---|---|---|---|---|---|---|
| | HIPS | XL-130 | Ca-stearate | $Sb_2O_3$ | TBPMI | Initial | Final | |
| 1 | 56 | 0.4 | 0.5 | 5.5 | 38.1 | 8.7 | 12 | 35.9 |
| 2 | 41.3 | 0.6 | 0.5 | 7.3 | 50.8 | 6.5 | 9.5 | 40.4 |

The results clearly shown the increase of torque imparted by grafting with TBPMI. The product of Exp. 1 was dissolved in tetrahydrofuran and the $Sb_2O_3$ which precipitated was filtered off. Chromatographic analysis showed only traces of TBPMI monomer to be present.

EXAMPLE 3

The same procedure as described in Example 2 was used with the following mixture:
4 g polybutadiene.
42.1 g styrene.
27.4 g acrylonitrile.
27.4 g TBPMI.
1.5 g azoisobutyronitrile.

The resulting polymer contained 16% bromine and had an LOI of 24.5.

EXAMPLE 4

100 parts of natural rubber were blended with 30 parts of TBPMI and irradiated at room temperature with 25 megarads from a $Co^{60}$ source. The resulting vulcanisate had similar mechanical properties to that prepared from the same blend with the addition of 5 parts sulfur using a thermal vulcanisation process at 145 degrees centigrade for 15 minutes. Both products had good flammability resistance.

EXAMPLE 5

(The amounts given are by wt.)

The following reagents were introduce din a reaction vessel provided with a stirrer:
500 parts polyethylene powder (low density of a melt flow index 22 g/10 min).
1750 parts distilled water.
9 parts polyvinyl alcohol (as suspending agent).
20 parts TBPMI, and
1.5 parts lauroyl peroxide.

The above reagents were mixed until a homogeneous suspension was obtained. Then an amount of 480 parts of vinyl chloride monomer was added and the temperature was raised to 68 degrees centigrade. After four hours of reaction, the polymeric product was filtered off and found to exhibit good flammability resistance.

EXAMPLE 6

Ethylene-propylene rubber (EPR) is an elastomeric widespread use in wire and cable applications. It is of importance to provide elastomers for this application, fire retarded to meet the UL-94 VO flame resistance specifications without sacrifice of the mechanical properties. This is accomplished by the use of TBPMI as flame retardant.

The components (except dicumyl peroxide) described in the following table were blended in a Brabender Plasticorder at 125 degrees centigrade for 20 minutes at 20–25 RPM. Then the peroxide was introduced and mixing was continued for 3 minutes. The molten mass was removed from the mixing cell and pressed and cured into 2 mm thick plates for 30–45 minutes. The specimens were submitted to mechanical and fire resistance tests. From the results listed in the following Table 5, it can be seen that
1. TBMPI promotes cross-linking as seen from the time to torque increase.
2. TBPMI provides better fire retardancy than BT-93 on an equivalent bromine content.
3. The EPR flame retardant by TBPMI has better mechanical properties than that containing BT-93.

TABLE 5

Crosslinking of TBPMI onto EPR rubber (produced by ESSO under Trade Mark Vistalon 3708).

| Components | | | | |
|---|---|---|---|---|
| EPR rubber | 96 | 59.1 | 69.1 | 71.4 |
| TBPMI | 0 | 27.1 | 21.2 | 0 |
| Saytex BT-93 | 0 | 0 | 0 | 18.9 |
| $Sb_2O_3$ | 0 | 9.7 | 5.7 | 5.9 |
| Dicumyl Peroxide | 3 | 3 | 3 | 3 |
| Triallyl Cyanurate | 1 | 1 | 1 | 1 |
| % Br | 0 | 16 | 12.5 | 12.5 |
| Cure temp. degrees C. | 150 | 130 | 150 | 150 |
| Time to torque increase, min. | 13.4 | — | 3.5 | 6.4 |
| Gel content % | — | 93 | 97 | 97 |
| Shore hardness A | 65 | 74 | 71 | 69 |
| UL-94V rating, 2 mm | Not rated | VO | V2 | Not rated |
| LOI %, 2 mm | 18 | 30.1 | 26.9 | 25.8 |
| Tensile strength 100% MPa | 1.7 | 2.7 | 1.8 | 1.8 |
| 200 | 2.5 | 3.6 | 2.8 | 2.6 |
| ultimate | 5.1 | 10 | 4 | 2.7 |
| Elongation at break % | 630 | 660 | 320 | 210 |

The results clearly show the flame retardant property imparted to EPR rubber. The LOI values as well as the mechanical properties are better than the composition with a known fire retardant such as Saytex BT-93.

EXAMPLE 7

A. In 30 g liquid polyester resin (based on maleic, phthalic anhydrides and propylene glycol) containing 30–40% styrene, were dissolved 3.05 g TBPMI and to the mixture was added, by mixing continuously, 1.1 g $Sb_4O_6$ until the mixture became homogeneous. Then, to this homogeneous mixture were added 8 drops of a Co-octoate solution and 6 drops of a radical initiator (methylethylketone hydroperoxide). The mixture was quickly cast into a Teflon Mould containing cavities of 6×100×3 mm. The curing was performed at room temperature for two hours and then in an oven at 110 degrees C. The specimens were removed and left to cool. The LOI of these specimens was 29.2%.

B. The example is similar to the previous one excepting the $Sb_4O_6$ which here was absent and therefore 6.1 g TBPMI was added. After the same curing protocol the specimens had an LOI of 22.35. The LOI of the cured polyester resin without TBPMI was 18.7%.

EXAMPLE 8

Nylon 66 polyamide (prepared from adipic acid and hexamethylene diamine) in the form of fibers was soaked in a solution of TBPMI in dimethylformamide (DMF) overnight. The drained fibers were washed with water to remove the DMF and then irradiated with 2 meV electrons from a Van de Graaff generator at a 40 megarad dosage. The fibers were then extracted with xylene to remove the excess, unbound TBPMI. The weight gain of the fibers was 21% and they contained 12.5% Br. Twisted yarns of the treated fibers were found to have an LOI of 29.3. Untreated fibers had an LOI of 22.2.

EXAMPLE 9

Ten grams of polymethyl methacrylate (PMMA) and 2.71 g TBPMI were dissolved in 90 g. of toluene. The mixture was introduced into a reaction vessel and, under stirring, there was added 0.158 g. of dimenzoyl peroxide 80% (the balance of the latter being water commonly used for storage of this material). The temperature was gradually increased to 80–90 degrees centigrade while keeping the mixture under a nitrogen blanket. After 5 hours, the temperature was increased to reflux the toluene, and kept there for two hours.

The mixture was subsequently cooled and the co-polymer (graft) was precipitated by pouring the viscous solution slowly into vigorously stirred methanol.

The polymer was separated and dried at 60–70 degrees C. under vacuum.

Specimens pressed from the product had an LOI of 19.5%. The LOI of PMMA (nongrafted) was 17.7%.

EXAMPLE 10

A blend was prepared using the following components: Vistalon 3708 (ethylene-propylene rubber,

| | |
|---|---|
| Vistalon 3708 (ethylene-propylene rubber, produced by Exxon) | 21 parts |
| FR-1033 | 50 parts |
| antimony oxide | 25 parts |
| dicumyl peroxide | 3 parts |
| triallyl cyanurate | 1 part |

An amount of 95 gr of this blend is introduced in a BRABENDER PLASTICORDER PLE 651 heated at 80 degrees C. The mixing blades were rotated at a speed of 15 rpm during 22 minutes. The mixture was then crosslinked by compression molding at 130 degrees C. during 30 minutes. Specimens pressed from the product had an LOI of 32.1.

An important advantage which characterizes the present invention is its versatility, enabling to obtain a very large number of fire retardant compositions by grafting TBPMI with comonomers onto a preformed backbone polymer. Among the various suitable comonomers the following should be mentioned in particular: acrylate esters; methacrylate esters; vinyl acetate; vinyl halides; vinylidene halides; acrylonitrile; butadiene; chloroprene; styrene; iso-butylene; acrylamide; maleic anhydride and other maleimides. A person skilled in the art will select the proper comonomer according to the specific use of the respective composition.

Whereas the compositions according to the present invention are based on a reaction which involves crosslinking, various coagents for this type of reaction may be utilized, as known in the art (see for example page 331 in the Encyclopedia of Polymer Science and Technology, Vol. 4, H. F. Mark, Interscience Publ. Co., N.Y., 1966). Among these coagents the following should be in particular mentioned: triallyl cyanurate; triallyl isocyanurate; divinyl benzene; $S_2Cl_2$; bis-azodicarboxylates, dialyl phtalate, dimaleimides, ethylene dimethacrylate, ethylene glycol dimethacrylate, 1,3 butylene glycol dimethacrylate etc.

This fire retardant polymer compositions according to the present invention may further include, depending on the purposes, carbon black reinforcing agents such as glass fibers, carbon fibers and asbestos, fillers such as silica, alumina, silica-magnesia, calcium silicate, calcium carbonate, barium sulfate, lubricants such as higher fatty acid esters and paraffin waxes, as well as other stabilizers, antistatic agents, antioxidants, UV absorbers, dyes, pigments e.g. $TiO_2$ or the like, as generally utilized for such compositions.

While the invention has been described in connection with certain preferred embodiments and compositions, it will be understood that it is not intended to limit the invention to these particular Examples. On the contrary, it is intended to cover other alternatives, modifications or other compositions or ingredients as may be included within the scope of the invention as defined by the appended claims. It should be understood that the particulars described are by way of example and for purposes of illustrative discussion of some compositions of the present invention without being limited thereto.

We claim:

1. Fire retardant polymer compositions comprising non-linear structural configurations consisting essentially of from 2% to 60% by weight of N-tribromophenylmaleimide, or N-tribromophenylmaleimide together with a comonomer selected from the group consisting of an acrylate ester, a methacrylate ester, vinyl acetate, a vinyl halide, a vinylidene halide, acrylonitrile, butadiene, chloroprene, styrene, isobutylene, acrylamide, maleic anhydride and a mixture thereof, directly bonded by means of free-radical initiation to a preformed backbone polymer selected from the group consisting of a polyolefin, a polyamide, a natural rubber, a polyester, an acrylic polymer and a mixture or a copolymer thereof to form a graft polymer containing at least 1.2% by weight bromine in its pendant side chains or crosslinks.

2. Fire retardant polymer compositions according to claim 1, wherein acrylonitriles and alkenes are not used together as comonomers with N-tribromophenylmaleimide when the backbone polymer is a diene rubber.

3. Fire retardant polymer compositions according to claim 2, wherein the non-linear structural configurations comprise N-tribromophenylmaleimide in pendant side chains on the preformed backbone polymer.

4. Fire retardant polymer compositions according to claim 2, wherein the non-linear structural configurations result from the incorporation of N-tribromophenylmaleimide, with or without comonomers, as crosslinks between chains of the preformed backbone polymer.

5. Fire retardant polymer compositions according to claim 2, wherein an accelerator is incorporated in the compositions.

6. Fire retardant polymer compositions according to claim 5, wherein said accelerator is triallyl cyanurate.

7. Fire retardant polymer compositions according to claim 2, wherein the backbone polymer is at least 4% by weight of the total resin present in said compositions.

8. Fire retardant polymer compositions according to claim 7, wherein said preformed backbone polymer is polybutadiene.

9. Fire retardant polymer compositions according to claim 7, wherein said preformed backbone polymer is polyethylene.

10. Fire retardant polymer compositions according to claim 7, wherein said preformed backbone polymer is an ABS resin.

11. Fire retardant polymer compositions according to claim 7, wherein said preformed polymer is high impact polystyrene.

12. Fire retardant polymer compositions according to claim 7, wherein said preformed polymer is a natural rubber.

13. Fire retardant polymer compositions according to claim 2, wherein at least one flame retardant synergist is incorporated therein.

14. Fire retardant polymer compositions according to claim 13, wherein said synergist is antimony oxide.

15. Fire retardant polymer compositions according to claim 2, wherein the comonomer with N-tribromophenylmaleimide is selected from the group consisting of acrylonitrile, styrene and vinyl chloride.

16. A method for the preparation of a fire retardant polymer composition comprising non-linear structural configuration, comprising the step of directly grafting by free-radical initiation N-tribromophenylmaleimide or N-tribromophenylmaleimide together with a comonomer selected from the group consisting of an acrylate ester, a methacrylate ester, vinyl acetate, a vinyl halide, a vinylidene halide, acrylonitrile, butadiene, chloroprene, styrene, isobutylene, acrylamide, maleic anhydride and a mixture thereof, onto a preformed backbone polymer selected from the group consisting of a polyolefin, a polyamide, a natural rubber, a polyester, an acrylic polymer, and a mixture or copolymer thereof.

17. A method for the preparation of fire retardant polymer compositions according to claim 16, wherein the reaction is initiated by a free radical yielding initiator.

18. A method according to claim 17, wherein the free radical yielding initiator is selected from the group consisting of free radical yielding azo-compounds, organic and inorganic peroxides, persulfates, hydroperoxides and sulfur.

19. A method according to claim 17, wherein the initiation is induced by radiation.

20. A method according to claim 16, wherein conventional additives selected from pigments, fillers, fibers, lubricants, stabilizers, antistatic agents, antioxidants, UV absorbers and dyes are incorporated.

* * * * *